United States Patent
Gavarre et al.

(10) Patent No.: US 7,761,660 B1
(45) Date of Patent: *Jul. 20, 2010

(54) IDENTIFYING SUSPECT DISKS

(75) Inventors: Sherri Gavarre, Fremont, CA (US); Doug Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/508,064

(22) Filed: Jul. 23, 2009

Related U.S. Application Data

(63) Continuation of application No. 10/779,141, filed on Feb. 12, 2004, now Pat. No. 7,590,801.

(51) Int. Cl.
G06F 12/00 (2006.01)
G06F 13/00 (2006.01)
G06F 13/28 (2006.01)
(52) U.S. Cl. .................... 711/114; 711/E12.1
(58) Field of Classification Search .................. 711/114
See application file for complete search history.

(56) References Cited

U.S. PATENT DOCUMENTS

| | | | |
|---|---|---|---|
| 4,987,502 A | 1/1991 | Freeze | |
| 6,192,481 B1 | 2/2001 | Deenadhayalan et al. | |
| 6,229,743 B1 | 5/2001 | Matsumoto | |
| 6,282,051 B1 | 8/2001 | Albrecht et al. | |
| 6,289,356 B1 | 9/2001 | Hitz et al. | |
| 6,336,065 B1 | 1/2002 | Gibson et al. | |
| 6,735,033 B1 | 5/2004 | Codilian et al. | |
| 6,823,232 B2 | 11/2004 | Murphy | |
| 6,950,966 B2 | 9/2005 | Chiquoine et al. | |
| 7,293,203 B1 | 11/2007 | Coatney et al. | |
| 2002/0049886 A1 | 4/2002 | Furuya et al. | |
| 2005/0132040 A1 | 6/2005 | Ellis et al. | |

OTHER PUBLICATIONS

Gavarre et al., "Identifying Suspect Disks", U.S. Appl. No. 10/779,141, filed Feb. 12, 2004, 20 pages.

Primary Examiner—Sheng-Jen Tsai
(74) Attorney, Agent, or Firm—Cesari and McKenna, LLP

(57) ABSTRACT

A system and method for monitoring a group of storage devices for indications of a detected error. After receiving an indication that a first storage device in the group has experienced a detected error, a consecutive number of detected errors experienced by the first storage device is determined. If it is determined the consecutive number of detected errors experienced by the first storage device exceeds a threshold of more than one detected error before a second storage device in the group experiences one detected error, then in response, the consecutive number of detected errors experienced by the first storage device is reset. If the consecutive number of detected errors does exceed the threshold before the second storage device experiences the one detected error, then the first storage device is identified as a suspect storage device.

29 Claims, 4 Drawing Sheets

IDENTIFYING SUSPECT DISKS

CROSS-REFERENCE TO RELATED APPLICATIONS

The present application is a continuation of commonly assigned U.S. patent application Ser. No. 10/779,141, which was filed on Feb. 12, 2004, now U.S. Pat. No. 7,590,801, issued on Sep. 15, 2009 by Sherri Gavarre et al. for IDENTIFYING SUSPECT DISKS and is hereby incorporated by reference.

BACKGROUND OF THE INVENTION

The present invention relates to data storage systems.

A data storage system usually includes multiple storage devices, which can be, for example, disk drives (commonly referred to as disks). Unless the context indicates otherwise, the term disk is used in the present specification to embrace not only magnetic storage devices, but also optical, solid state, and other types of storage devices.

The disks of the data storage system can be organized into groups of multiple disks. A RAID array is an example of such a group. ("RAID" is an acronym for Redundant Array of Independent Disks).

During the operation of the data storage system, a disk in a group can fail, i.e., become incapable of correctly executing commands. In a RAID array, data on a disk that has failed must be reconstructed or recovered onto a new disk, which may be swapped into the array or may be a spare already in the array, from other disks in the array. For zo RAID arrays having single parity data, reconstruction or recovery may not be possible if two disks have failed. For RAID arrays having double parity data, for example, arrays implemented using RAID-DP™ technology available from. Network Appliance, Inc. of Sunnyvale, Calif., reconstruction or recovery is generally possible for two disk failures and, depending on configuration and minoring, even three, four, or five disks failures.

During reconstruction or recovery, a RAID array operates in a degraded state. Because disk failures can occur at inopportune times, for example, during high demand periods, RAID arrays can be forced to operate at a degraded state at these times.

SUMMARY OF THE INVENTION

The present invention provides methods and apparatus, including computer program products, for identifying suspect disks. This allows a system implementing the invention to preemptively replace the suspect disk before the suspect disk fails, and do so at an opportune time.

In general, in one aspect, the invention features a method that includes monitoring a group of multiple disks for indications of a detected error. The method includes determining after receiving an indication that a first disk in the group has had a detected error, a consecutive number of detected errors for the first disk. The consecutive number of detected errors is the number of errors detected for the first disk after a most recent error detected for any other disk in the group of multiple disks. The method includes identifying the first disk as a suspect disk if the consecutive number of detected errors exceeds a threshold.

In general, in another aspect, the invention features a computer program product, tangibly stored on machine readable medium, that includes instructions operable to cause data processing apparatus to monitor a group of multiple disks for indications of a zo detected error. The product includes instructions to determine, after receiving an indication that a first disk in the group has had a detected error, a consecutive number of detected errors for the first disk. The consecutive number of detected errors is the number of errors detected for the first disk after a most recent error detected for any other disk in the group of multiple disks. The product includes instructions to identify the first disk as a suspect disk if the consecutive number of detected errors exceeds a threshold.

In general, in another aspect, the invention features a system that includes means for monitoring a group of multiple disks for indications of a detected error. The system includes means for receiving an indication that a first disk in the group has had a detected error. The system includes means for determining a consecutive number of detected errors for the first disk. The consecutive number of detected errors is the number of errors detected for the first disk after a most recent error detected for any other disk in the group. The system includes means for identifying the first disk as a suspect disk if the consecutive number of detected errors exceeds a threshold.

The invention can be implemented to realize one or more of the following advantages. A system in accordance with the invention can identify a suspect disk based on indications of its performance that do not involve overt failures. The system can thus proactively manage its disks and replace, at an opportune time, a disk that is suspect before it fails. The system can distinguish between errors likely to be caused by a disk and other types of errors. The system can monitor different types of errors for each disk in a group of multiple disks. The system can monitor the group and identify a particular disk that is likely to fail. The system can enhance the reliability of a RAID system. The system can lower the latency of the RAID system. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
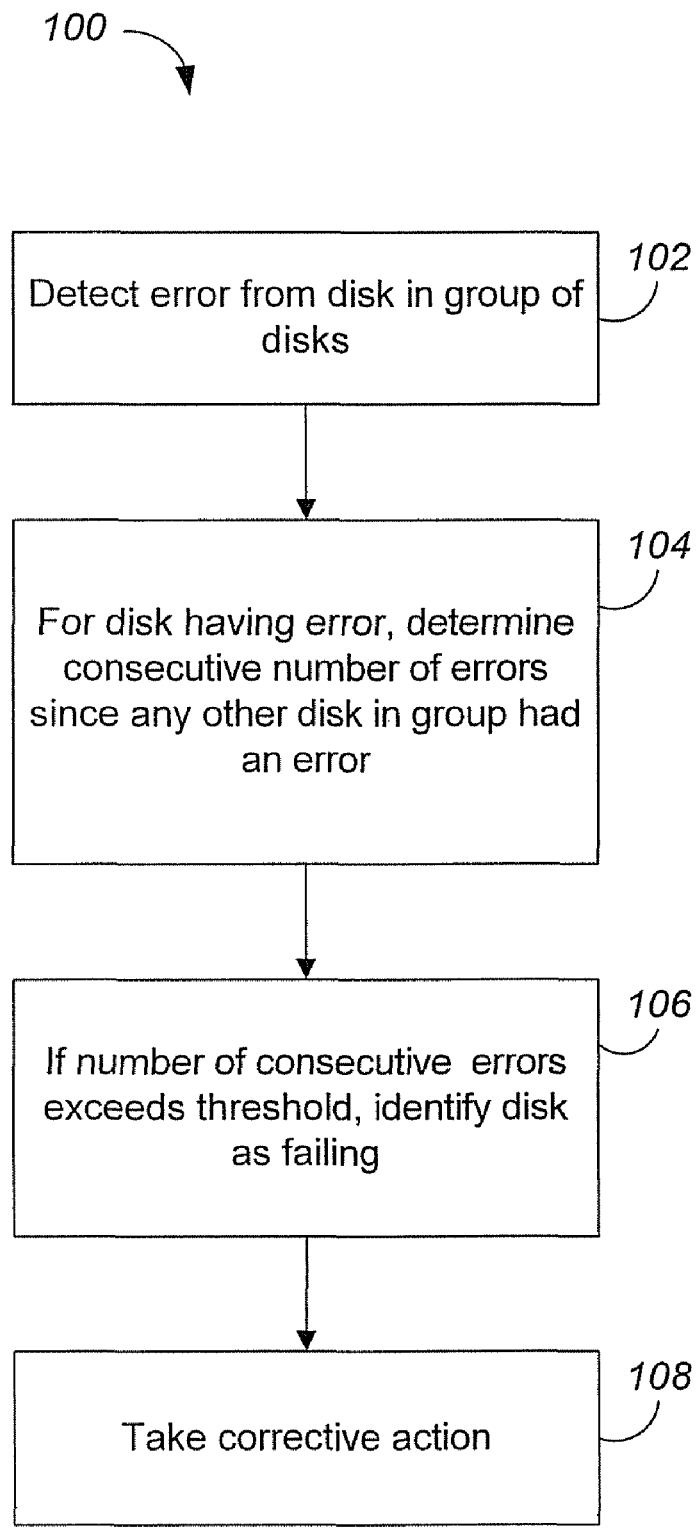
FIG. 1 shows a method for identifying suspect disks based on consecutive errors.

FIG. 1 shows a method 100 for identifying a suspect disk in a group of multiple disks. If the method can be performed in one or more components of a data storage system or subsystem that controls operation of the group of disks, as will be described later. For ease of exposition, the method will be described as being performed by a system.

The system monitors the disks in the group for errors. When the system detects that a disk in the group has experienced an error (step 102), it determines the consecutive number of errors the disk has had subsequent to any other disk in the group having an error (step 104). If the number of consecutive errors for the disk exceeds a threshold, the system identifies the disk as suspect (step 106). When a disk is identified as suspect, the system can take corrective action (step 108).

The system can detect an error (step 102) by receiving an indication that the disk experienced an error. The error can be a timeout error, i.e., a failure of a disk to respond to a command within a particular period of time, usually specified by the manufacturer of the disk. Alternatively, the error can be a media error, a recovered error, or other types of errors. A media error generally results from a flaw in the surface of a magnetic disk. A recovered error usually occurs when a disk successfully executes a command but had to resort to an internal error recovery mechanism to do so. The system can receive the indication by, for example, receiving an error message or a command block, which is described below.

The number of consecutive errors can be calculated in a variety of ways. In one implementation, the consecutive number of errors of a disk is the total number of errors of the same type attributed to disk; that is, errors of different types are counted separately. When the disk has a timeout error, for example, the consecutive number is the total number of timeout errors experienced by the disk since any other disk in the group had a timeout error. Alternatively, the consecutive number of errors can be the total number of any type of errors attributed to the disk since any other disk in the group had an error of any kind.

Determining the consecutive number of errors for a disk can be accomplished by retrieving a current count of errors experienced by the disk. The current count can be incremented for each detected error experienced by the disk and reset to zero whenever any other disk in the group experiences an error. If different error types are counted separately, the current count is incremented and reset in response to errors of the same type, for example, all timeout errors. If different error types are counted together, the current count is incremented and reset in response to any errors.

There are different ways to count timeout errors. Given a command, a disk is usually allowed a particular number of attempts or retries to execute the command. If the disk executes the command, for example, to read data, within the number of retries allowed, then the disk has successfully executed the command. In one alternative, one timeout error is attributed to a disk when the disk requires one or more retries to execute a command, and the current timeout error count for the disk is incremented by one, regardless of the number of retries. One timeout error is attributed to a disk that, for example, successfully executed a command but required three retries to do so. In another alternative, one timeout error is counted for each retry the disk made to execute a command. For example, three timeout errors would be attributed to the disk that successfully executed a command but required three retries to do so, and the current timeout error count for the disk would be incremented by three.

The threshold used to determine whether a disk is suspect (see step 106) can represent an absolute count or a count over a time window. If the system is considering different error types separately, a separate threshold can optionally be applied to each different error type. If the threshold is applied to a time window, the threshold would be a number of consecutive errors per unit time, for example, ten timeout errors in seven days for consecutive timeout errors or twenty-five errors in ten minutes for cumulative media errors. Cumulative errors are the total number of errors the disk experienced, regardless of any intervening errors experienced by any other disk in the group. In an implementation where the threshold is applied over a time window, the system records a timestamp for each detected error. The timestamp for a detected error can be the timestamp of a command associated with the detected error. Errors that are older than the beginning of the time window can optionally be discarded. The threshold or thresholds are typically determined empirically and different for different data storage systems.

Corrective action (see step 108) can include notifying a software or other system element that is monitoring or controlling the disk group that the disk is suspect. If the group is a RAID array, the RAID subsystem or controller can fail out the suspect disk, i.e., reconstruct the data stored on the identified disk onto another disk, for example, a spare or a replacement, at a convenient time, for example, during periods expected to have few requests. A RAID system generally will not fail out a suspect disk if the RAID zo system is already in a degraded state, for example, after another disk has failed but before reconstruction of it is completed.

Figure 2:
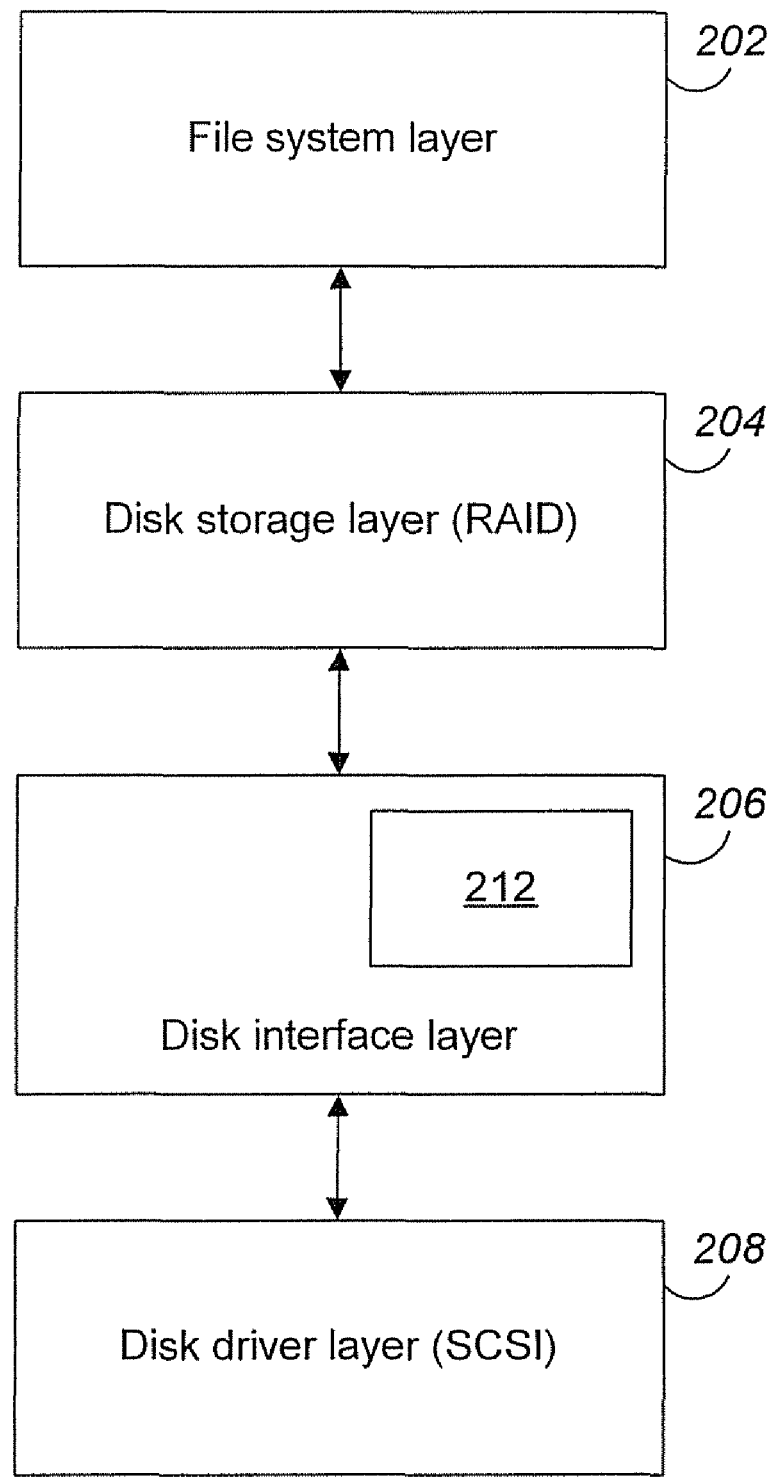
FIG. 2 illustrates schematically a storage operating system in which the invention can be implemented.

FIG. 2 illustrates schematically elements of a storage operating system in which the present invention can be implemented. In general, the term storage operating system refers to computer executable code operable on a data storage system to manage data access and, in some cases, to implement file system semantics. The storage operating system includes a file system layer 202 to organize data stored on disks logically as a hierarchal structure of directories and files. In addition, the storage operating system includes a disk storage layer 204 that implements a disk storage architecture, in this example, a RAID architecture and a disk subsystem. The disk subsystem includes a disk interface layer 206 and a disk driver layer 208 that implements a disk access protocol, for example, a Small Computer Systems Interface (SCSI) protocol.

In response to a request, the file system layer 202 sends a command to the disk storage layer 204, which interprets the command, generates its own command(s) to the appropriate disk driver(s) in the disk driver layer 208, and sends such command(s) through the disk interface layer 206 to the appropriate disk drivers in the disk driver layer 208. The disk drivers execute the commands. These elements can be implemented as software, in hardware, or a combination of hardware and software.

The method for identifying suspect disks, described above in reference to FIG. 1, can be implemented in a component 212 of the disk interface layer 206. Alternatively, the method can be implemented in other layers, or in multiple layers, or separately from these layers.

In one implementation, the storage operating system is the Data ONTAP™ software available from Network Appliance, Inc. The Data ONTAP™ software includes an implementation of the component 212 and the Write Anywhere File Layout (WAFL™) system. The WAFL™ file system is described in commonly assigned U.S. Pat. No. 6,289,356, entitled "Write Anywhere File System Layout," issued Sep. 11, 2001, which is hereby incorporated by reference in its entirety.

Figure 3:
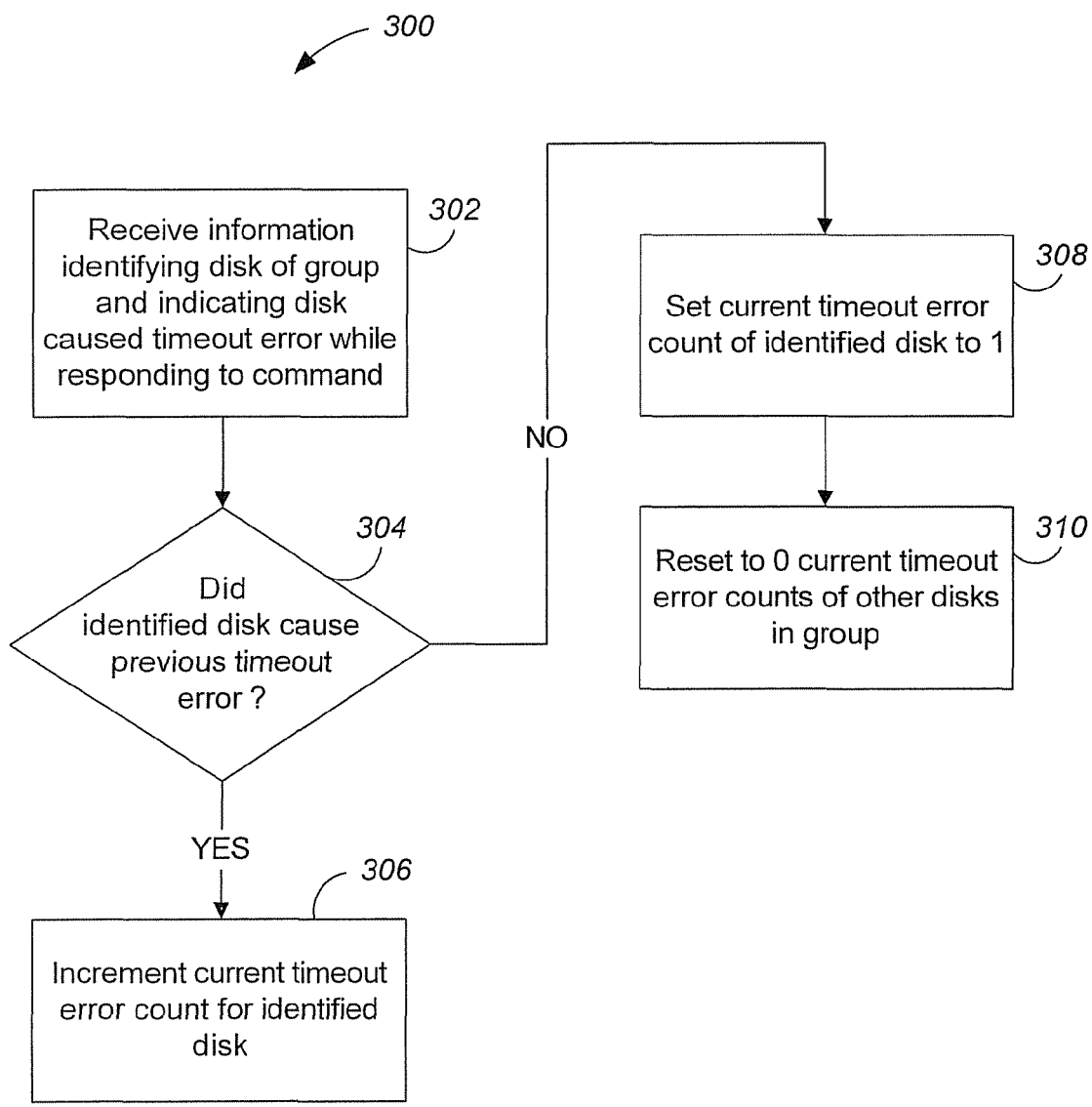
FIG. 3 shows a method for determining the number of consecutive detected timeout errors.

FIG. 3 shows a method 300 for determining the number of consecutive detected timeout errors. The method 300 is one implementation of step 104 of method 100 (FIG. 1). A component for identifying suspect disks, for example, the component 212 of FIG. 2, receives information (step 302) identifying a disk in a group of multiple disks and indicating that the disk had a timeout error while responding to a command and the time or approximate time the error occurred. The information can be obtained from a command block sent from the disk driver layer 208 to the disk storage layer 206. A command block generally includes information related to the execution of the command. In one implementation, the disk driver layer 206 (FIG. 2), in response to receiving instructions from the disk storage layer 402, generates and sends one or more command blocks to the disk driver layer 208. After execution or attempted execution, the disk driver layer 208 adds information to a command block, if appropriate, and returns the command block to the disk interface layer 206. The component 212 can monitor such command blocks for error indications. The time can be read from a system clock if it is not in the command block.

The component determines whether the identified disk (among all the disks in the group) had the previous (i.e., most recent) timeout error (step 304). One way of making such a determination is to check the current timeout count for the identified disk. The current timeout count can be stored in the memory of a computer on which the storage operating system runs, either as persistent or non-persistent data. If this count is not zero, then the disk had the previous timeout error. Alternatively, the component can store an identifier of the disk that had the previous timeout error and compare it with the identifier of the disk that experienced the current timeout error.

If the identified disk had the previous timeout error, the component increments the current timeout error count for the disk (step 306). This can be done as described above in reference to FIG. 1.

If the identified disk did not experienced the previous timeout error, the component sets the current timeout error count for the disk to one (step 308). Alternatively, the current timeout error count for the identified disk can be set to be the number of retries indicated in the command block. For other disks in the group, the component resets their current timeout error counts to zero (step 310).

Figure 4:
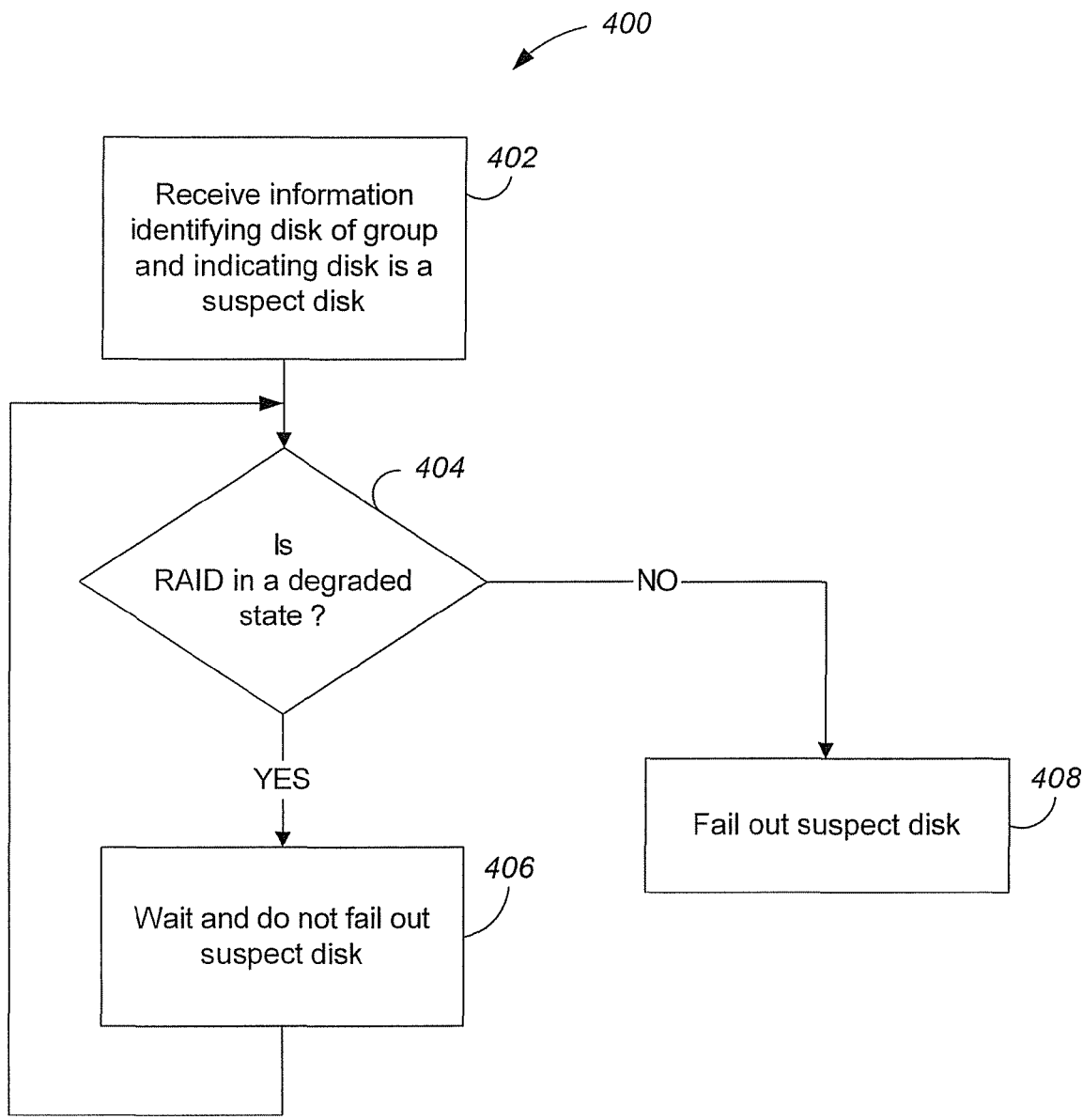
FIG. 4 shows a method for taking corrective action once a disk is identified as a suspect disk.

FIG. 4 shows a method 400 for taking corrective action once a disk is identified as a suspect disk. Method 400 is one implementation of step 108 of method 100 (FIG. 1). A storage operating system receives information identifying a disk as a suspect disk (step 402). The disk, for example, a Fibre Channel disk, is part of a group of multiple disks, for example, a RAID array. The system determines whether the RAID array is in a degraded state (step 404). As discussed above, the RAID array is in a degraded state after a disk failure but before reconstruction has completed. If so, the system waits and does not fail out the suspect disk (step 406). Otherwise, the system fails out the suspect disk (step 408). As described earlier, failing out a disk generally includes reconstructing data on a different disk, for example, a replacement or a spare disk. Failing out a disk can include storing information about the failure on a scratch area of the disk as described in commonly assigned U.S. Pat. No. 7,293,203, issued Nov. 6, 2007, entitled "System and Method for Logging Disk Failure Analysis in Disk Nonvolatile Memory," which application is hereby incorporated by reference in its entirety.

Optionally, the system can fail out a suspect disk even when the RAID array is in a degraded state, depending on the RAID level of protection being implemented. If, for example, the RAID array has a level of protection such that data reconstruction is possible with two concurrent disk failures, then the system can fail out a suspect disk while one disk in the RAID array is being reconstructed.

The invention and all of the functional operations described in this specification can be implemented in digital electronic circuitry, or in computer software, firmware, or hardware, including the structural means disclosed in this specification and structural equivalents thereof, or in combinations of them, The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers, A computer program (also known as a program, software, software application, or code) can be written in any form of programming language, including compiled or interpreted languages, and it can be deployed in any form, including as a stand-alone program or as a module, component, subroutine, or other unit suitable for use in a computing environment, A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and anyone or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the operations of the invention can be performed in a different order and still achieve desirable results. The methods and apparatus described in the present specification can be adapted to a variety of data storage system architectures including, but not limited to, network attached storage, storage area network, and disk assembly directly attached to a client or host computer, The term data storage system should, therefore, be taken to embrace such arrangements. The specification discusses timeout, media, and recovered errors. Other types of errors can be used as indications of an increased likelihood of disk failure.

What is claimed is:

1. A computer method for operating a group of storage devices, comprising:
   monitoring the group of storage devices for indications of a detected error;
   determining, after receiving an indication that a first storage device in the group has experienced a detected error, a consecutive number of detected errors experienced by the first storage device;
   determining if the consecutive number of detected errors experienced by the first storage device exceeds a threshold of more than one detected error before a second storage device in the group experiences one detected error;
   resetting, in response to determining that the second storage device in the group experienced the one detected error before the first storage device exceeded the threshold, the consecutive number of detected errors experienced by the first storage device; and identifying the first storage device as a suspect storage device if the consecutive number of detected errors does exceed the threshold before the second storage device experiences the one detected error.

2. The method of claim 1 wherein at least one storage device of the group of storage devices is a magneto-optical disks.

3. The method of claim 1 wherein at least one storage device of the group of storage devices is a semiconductor memory device.

4. The method of claim 1 wherein at least one storage device of the group of storage devices is an EPROM.

5. The method of claim 1 wherein at least one storage device of the group of storage devices is an EEPROM.

6. The method of claim 1 wherein at least one storage device of the group of storage devices is a flash memory device.

7. The method of claim 1 wherein at least one storage device of the group of storage devices is a magnetic disk.

8. The method of claim 1 wherein at least one storage device of the group of storage devices is an internal hard disk.

9. The method of claim 1 wherein at least one storage device of the group of storage devices is a removable disk.

10. The method of claim 1 wherein at least one storage device of the group of storage devices is a CD-ROM.

11. The method of claim 1 wherein at least one storage device of the group of storage devices is a DVD-ROM.

12. The method of claim 1 further comprising:
calculating the consecutive number of errors as the consecutive number of errors of a same error type, wherein a separate threshold is applied to each error type; and
identifying the first storage device as the suspect storage device if the consecutive number of errors of the same error type experienced by the first storage device exceeds the separate threshold applied to the same error type before another storage device in the group experiences the same error type.

13. The method of claim 1, wherein the group is organized as a RAID system.

14. The method of claim 13, further comprising:
determining if the RAID system is in a degraded state; and
reconstructing, in response to determining the RAID system is in the degraded state, data of the first storage device on a different storage device when the RAID system is no longer in the degraded state.

15. A computer readable media containing executable program instructions executed by a processor, comprising:
program instructions that monitor the group of storage devices for indications of a detected error;
program instructions that determine, after receiving an indication that a first storage device in the group has experienced a detected error, a consecutive number of detected errors experienced by the first storage device;
program instructions that determine if the consecutive number of detected errors experienced by the first storage device exceeds a threshold of more than one detected error before a second storage device in the group experiences one detected error;
program instructions that reset, in response to determining that the second storage device in the group experienced the one detected error before the first storage device exceeded the threshold, the consecutive number of detected errors experienced by the first storage device; and
program instructions that identify the first storage device as a suspect storage device if the consecutive number of detected errors does exceed the threshold before the second storage device experiences the one detected error.

16. The computer readable media of claim 15 wherein at least one storage device of the group of storage devices is a flash memory device.

17. A computer data storage system, comprising:
the data storage system configured to monitor a group of storage devices for indications of a detected error;
the data storage system further configured to determine, after receiving an indication that a first storage device in the group has experienced a detected error, a consecutive number of detected errors experienced by the first storage device;
the data storage system further configured to determine if the consecutive number of detected errors experienced by the first storage device exceeds a threshold of more than one detected error before a second storage device in the group experiences one detected error;
the data storage system further configured to reset, in response to determining that the second storage device in the group experienced the one detected error before the first storage device exceeded the threshold, the consecutive number of detected errors experienced by the first storage device; and
the data storage system further configured to identify the first storage device as a suspect storage device if the consecutive number of detected errors does exceed the threshold before the second storage device experiences the one detected error.

18. The computer data storage system of claim 17 wherein at least one storage device of the group of storage devices is a magneto-optical disks.

19. The computer data storage system of claim 17 wherein at least one storage device of the group of storage devices is a semiconductor memory device.

20. The computer data storage system of claim 17 wherein at least one storage device of the group of storage devices is an EPROM.

21. The computer data storage system of claim 17 wherein at least one storage device of the group of storage devices is an EEPROM.

22. The computer data storage system of claim 17 wherein at least one storage device of the group of storage devices is a flash memory device.

23. The computer data storage system of claim 17 wherein at least one storage device of the group of storage devices is a magnetic disk.

24. The computer data storage system of claim 17 wherein at least one storage device of the group of storage devices is an internal hard disk.

25. The computer data storage system of claim 17 wherein at least one storage device of the group of storage devices is a removable disk.

26. The computer data storage system of claim 17 wherein at least one storage device of the group of storage devices is a CD-ROM.

27. The computer data storage system of claim 17 wherein at least one storage device of the group of storage devices is a DVD-ROM.

28. The computer data storage system of claim 17 wherein the consecutive number of errors is calculated as the consecutive number of errors of a same error type, and wherein a separate threshold is applied to each error type.

29. The computer data storage system of claim 17 wherein the group is configured as a RAID system.

* * * * *

UNITED STATES PATENT AND TRADEMARK OFFICE
CERTIFICATE OF CORRECTION

| | | |
|---|---|---|
| PATENT NO. | : 7,761,660 B1 | Page 1 of 1 |
| APPLICATION NO. | : 12/508064 | |
| DATED | : July 20, 2010 | |
| INVENTOR(S) | : Sherri Gavarre et al. | |

It is certified that error appears in the above-identified patent and that said Letters Patent is hereby corrected as shown below:

Please amend Col. 1, line 38 as shown below:
configuration and ~~minoring~~ mirroring, even three, four, or five disks Please amend Col. 2, line 1 as shown below:
indications of a ~~zo~~-detected error. The product includes Please amend Col. 4, line 13 as shown below:
not fail out at a suspect disk if the RAID ~~zo~~-system is already in Signed and Sealed this
Fourteenth Day of June, 2011

David J. Kappos
*Director of the United States Patent and Trademark Office*